US010313735B2

(12) United States Patent
Keipert

(10) Patent No.: US 10,313,735 B2
(45) Date of Patent: Jun. 4, 2019

(54) LIVE VIDEO RECALL LIST

(71) Applicant: Dish Technologies L.L.C., Englewood, CO (US)

(72) Inventor: Kurt Keipert, Littleton, CO (US)

(73) Assignee: Dish Technologies L.L.C., Englewood, CO (US)

( * ) Notice: Subject to any disclaimer, the term of this patent is extended or adjusted under 35 U.S.C. 154(b) by 0 days.

(21) Appl. No.: 14/962,884

(22) Filed: Dec. 8, 2015

(65) Prior Publication Data

US 2017/0164035 A1   Jun. 8, 2017

(51) Int. Cl.
| | |
|---|---|
| *H04N 21/61* | (2011.01) |
| *H04N 21/426* | (2011.01) |
| *H04N 21/431* | (2011.01) |
| *H04N 21/858* | (2011.01) |
| *H04N 21/2187* | (2011.01) |

(52) U.S. Cl.
CPC ..... *H04N 21/4312* (2013.01); *H04N 21/2187* (2013.01); *H04N 21/4263* (2013.01); *H04N 21/6143* (2013.01); *H04N 21/8583* (2013.01)

(58) Field of Classification Search
CPC . G06F 3/04817; G06T 15/00; H04N 1/00424; H04N 1/00442; H04N 21/4755
See application file for complete search history.

(56) References Cited

U.S. PATENT DOCUMENTS

| | | | | |
|---|---|---|---|---|
| 2006/0064716 A1* | 3/2006 | Sull | .................... | G06F 17/30793 725/37 |
| 2007/0079330 A1* | 4/2007 | Ludvig et al. | ........... | H04N 5/44 725/38 |
| 2008/0066103 A1* | 3/2008 | Ellis | .................... | H04N 5/44591 725/38 |
| 2009/0204929 A1* | 8/2009 | Baurmann | ......... | H04N 5/44543 715/836 |
| 2009/0322962 A1* | 12/2009 | Weeks | ............... | H04N 7/17318 348/726 |
| 2012/0060190 A1* | 3/2012 | Lee | .................... | H04N 5/44543 725/46 |
| 2012/0072952 A1* | 3/2012 | Vaysman | ........... | H04N 5/44543 725/40 |
| 2012/0271004 A1* | 10/2012 | Quinebeche et al. | ....................... | H05B 33/0842 315/112 |
| 2015/0312618 A1* | 10/2015 | McElhatten | ....... | H04N 5/44543 725/53 |

* cited by examiner

*Primary Examiner* — Benjamin R Bruckart
*Assistant Examiner* — Anthony Bantamoi
(74) *Attorney, Agent, or Firm* — Seed IP Law Group LLP

(57) ABSTRACT

A method and apparatus for display of a recall list is disclosed. In the method and apparatus, a content receiver receives a first recall command from a remote control and presents, on a display screen, a recall list. The recall list includes a plurality of live video streams of a respective plurality of channels included in the recall list. A live video stream is displayed in a respective region of the display screen. The live video stream may be a live broadcast of a respective channel showing an active live program. The content receiver receives a live stream selection from the remote control. The selected video stream is then displayed on the display screen.

18 Claims, 5 Drawing Sheets

LIVE VIDEO RECALL LIST

BACKGROUND

Technical Field

This application is directed to a recall list that displays live video and, in particular, a recall list that displays a plurality of video streams of a respective plurality of media channels included in the recall list.

Description of the Related Art

Conventional television receivers and associated remote controls typically allow a user to navigate back to a previously viewed channel by actuating a recall button (sometimes labelled as "LAST" on a remote control). Actuating the recall button causes the video stream of the previously viewed channel to be displayed in full-screen mode. In these conventional receivers, the user may not be apprised of the content of the video stream of the previously viewed channel without switching over to the previously viewed channel. Oftentimes, the user may no longer be interested in the content of the video stream and the user navigates back to the channel he/she was viewing by, for example, actuating the recall button for a second time.

BRIEF SUMMARY

A recall list that shows a number of live video streams of previously viewed channels or programs is disclosed. The recall list may be displayed in response to a user pressing a recall button (or a "LAST" button) or a remote control. Prior to pressing the recall button, the user may be viewing a first video stream (for example, of a media channel) in full screen mode of a display (such as a television). The user may have previously viewed other channels or viewed stored or streamed programs.

Pressing the recall button will result in a recall list being displayed to the user. The recall list identifies a number of channels previously viewed by the user, for example, in chronological order of their viewing. The user may select a channel from the recall list and view the channel in full screen mode. As part of displaying the recall list, the video streams (for example, live broadcasts) corresponding to the channels are displayed. The user may make a determination based on the video streams of the recall list whether she/he wishes to view any one of the channels in full screen mode without having to view the channel in full screen mode. For example, the user may identify the programming being televised based on the recall list. The user based on their identification of programming being televised may determine whether they wish to select the channel from the recall list for viewing in full screen mode. For example, if recall list shows that advertisements are being broadcast on particular channels, the user may avoid these channels. Further, if recall list shows that a program of interest to the user is being broadcast on channel, the user may select the channel to view the program of interest in full screen mode. Thus, the live video recall list described herein improves the user experience in interacting with the television receiver.

DETAILED DESCRIPTION

Figure 1:
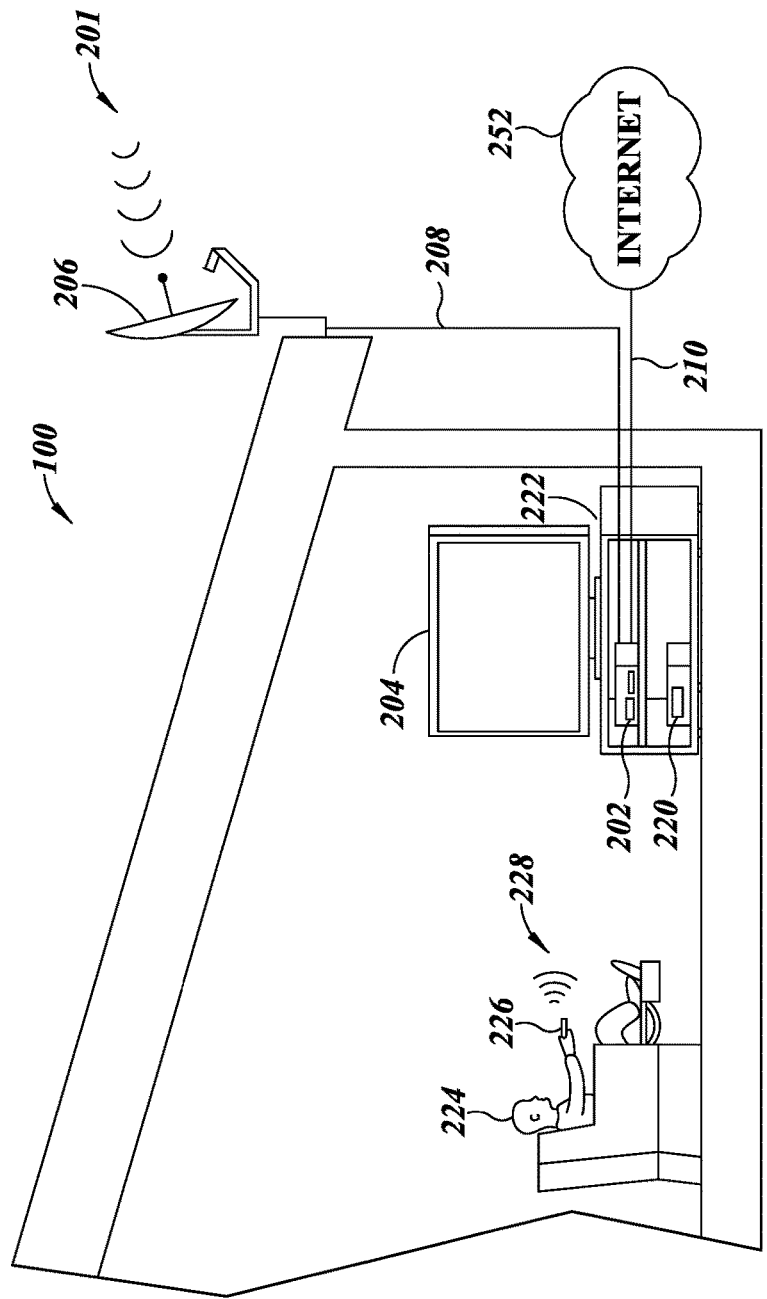
FIG. 1 illustrates an exemplary media subscription service environment that includes a content receiver system, according to one embodiment.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a content receiver or set-top box supported by the media provider or by a third party maintenance service provider. Such hardware can also include, for example, digital video recorder (DVR) devices and/or digital-video-disc (DVD) recording devices or other accessory devices inside, or separate from, the set-top box.

Throughout the specification, the term "subscriber" refers to an end user who is a customer of a media service provider and who has an account associated with the media service provider. Subscriber equipment resides at the subscriber's address. The terms "user" and "viewer" refer to anyone using part or all of the home entertainment system components described herein.

One skilled in the art will recognize that the present disclosure can also apply to other types of systems that offer technical support to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an A/C signal, or a D/C signal. Uses of the term "signal" in the description can include any of these different interpretations. It will also be understood to one skilled in the art that the term "connected" is not limited to a physical connection but can refer to any means of communicatively or operatively coupling two devices.

As a general matter, the disclosure uses the term content receiver as a broad term that includes a television converter, receiver, set-top box, television receiving device, television receiver, television recording device, satellite set-top box, satellite receiver, cable set-top box, and cable receiver, and content receiver, to refer to electronic equipment that has the capacity to acquire, process and distribute for viewing one or more television signals transmitted by broadcast, cable, telephone or satellite distributors. DVR and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a content receiver. The signals transmitted by these broadcast, cable, telephone, satellite, or other distributors can include, individually or in any combination, Internet, radio, television or telephonic data, and streaming media.

As yet another general matter, it will be understood by one skilled in the art that the term "television" refers to a television set or video display that can contain an integrated television converter device, for example, an internal cable-ready television tuner housed inside a television or, alternatively, connected to an external television converter device such as an external set-top box connected via cabling to a television. A further example of an external television converter device is the EchoStar Hopper combination satellite set-top box and DVR.

In the figures, identical reference numbers identify similar features or elements. The sizes and relative positions of the features in the figures are not necessarily drawn to scale.

Turning now to the drawings, FIG. 1 illustrates an exemplary media subscription service environment that includes a content receiver system 100, according to one embodiment. A basic content receiver system 100 includes a content receiver 202, also called a set-top box in some systems, communicatively coupled to a source of media content, for presentation on a display 204. The media content is provided as a media signal 201.

In the exemplary embodiment shown in FIG. 1, the content receiver system 100 is a home media entertainment system, and the media signal 201 is a satellite signal received by the rooftop-mounted satellite receiving antenna 206. The content receiver 202 receives media content from the satellite receiving antenna 206 via a communication link 208.

While the content receiver 202 is described herein as being connected to a satellite receiving antenna 206, in other embodiments the content receiver 202 can receive media content from other sources. For example, the content receiver 202 can receive media content via an antenna which receives terrestrial broadcast signals. Alternatively, the content receiver 202 can receive media content via the media signal 201 received via a broadband cable subscriber service. Additionally or alternatively, the content receiver 202 can receive media content via the media signal 201 received directly from the Internet 252 via a network communication link 210, using an Internet-based media subscription service. Furthermore, a content provider may provide to the subscriber multiple media signals 201 via satellite (as shown) and/or via the Internet 252, broadband cable and/or Internet, or in any other suitable way.

The content receiver 202 can be coupled to a television, or the content receiver 202 can be in the form of hardware built into a television, wherein the set-top box receives content from the media service provider. Alternatively, the content receiver 202 can be any electronic device that receives media content by accessing the Internet 252; for example, a gaming console, a smart phone, a tablet computer, a laptop computer, or a desktop computer.

The display 204 can be any kind of video display device such as a cathode ray tube display, a liquid crystal display (LCD), a plasma display, a television, a computer monitor, a rear projection screen, a front projection screen, a heads-up display, or any other electronic display device. The display 204 can include audio speakers, or the display 204 can be coupled to separate audio speakers. The term "for display" as used herein generally includes presentation of an audio component as well as a video component of the media signal 201.

The communication links 208 and 210 typically are wired connections such as one or more coaxial cables. One skilled in the art will recognize that other methods and other systems of delivering the media signal 201 to the content receiver 202 may be possible. For example, one or both of the communication links 208 and 210 can be wireless links.

The content receiver 202 optionally further includes one or more peripheral devices 220 such as a media playback device including, but not limited to, a DVD player, a VCR, a stereo, a television, a game console, or a stand-alone DVR device that provides an alternate source of content directly to the display 204 via a wireless or a wired connection 222. Any of the peripheral devices 220 can be subscriber-owned devices, or they can be supplied by the media subscription service.

The remote control 226 can be operated by a user, for example, the subscriber 224, to cause the content receiver 202 to display received content on the display 204. The remote control 226 may also be used by a viewer to display a programming guide and to communicate program selections to the content receiver 202. The remote control 226 is communicatively coupled to the content receiver 202 via a wireless path 228, for example, an infrared (IR) signal. The remote control 226 can be used to send commands to the satellite content receiver 202, including channel selections, display settings, and DVR instructions. The wireless path 228 can use, for example, infrared or UHF transmitters within the remote control 226. One example of an embodiment of the remote control 226 is the EchoStar Technologies L.L.C. 40.0 Remote Control that includes an IR transmitter and an ultra-high frequency (UHF) transmitter. The remote control 226 may be able to send signals to the other peripheral devices 220 that form part of the content receiver system 100. The content receiver 202 may also be able to send signals to the remote control 226, including, but not limited to, signals to configure the remote control 226 to operate the other peripheral devices in the content receiver system 100. In some embodiments, the remote control 226 has a set of Light Emitting Diodes (LEDs). Some remote controls can include Liquid Crystal Displays (LCDs) or other screens. The remote control 226 can include buttons, dials, or other man-machine interfaces. While the remote control 226 can often be the common means for a user to communicate with the satellite content receiver 202, one skilled in the art will recognize that other means of communicating with the content receiver 202 are available, including, but not limited to, attached keyboards, smart phones, front panel buttons or touch screens.

The satellite receiving antenna 206 receives media content via the media signal 201 from one or more satellite transponders in earth orbit. Each satellite transponder is, for purposes of the content receiver system 100, a source of content that transmits one or more media channels to the satellite receiving antenna 206. A satellite television distributor can transmit one or more satellite television signals to one or more satellites. Satellite television distributors can utilize several satellites to relay the satellite television signals to the subscriber 224. Each satellite can have several transponders. Transponders transmit the satellite signal from the satellite to the satellite receiving antenna 206.

Figure 2:
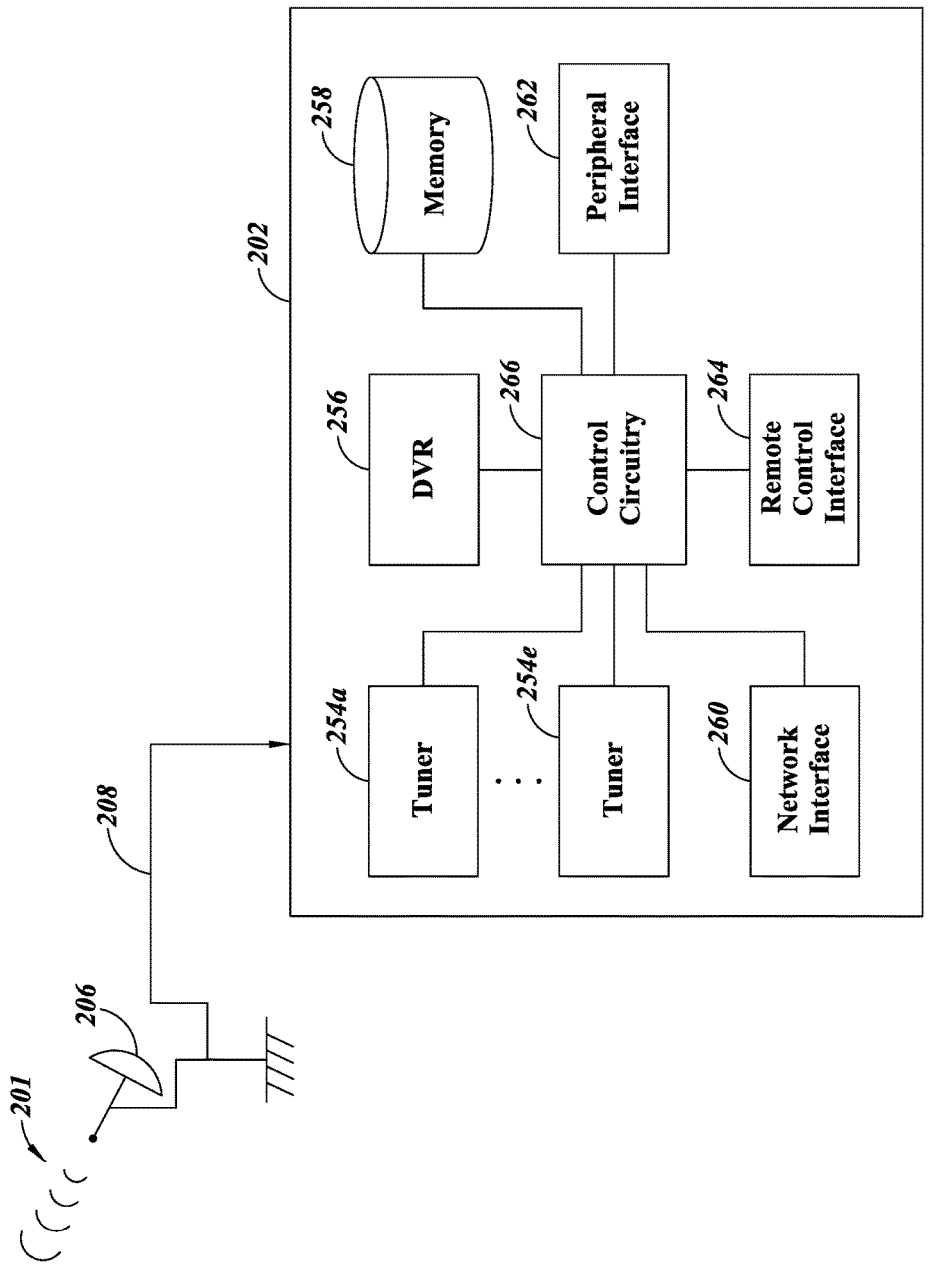
FIG. 2 shows components of the content receiver suitable for use in combination with an embodiment of the present disclosure.

FIG. 2 shows components of the content receiver 202 suitable for use in combination with an embodiment of the present disclosure. Components of the content receiver 202 include control circuitry 266, one or more tuners 254a-e (collectively referred to herein as tuner 254), an optional internal digital video recorder (DVR) 256, a non-transitory computer readable memory 258, a network interface 260, a peripheral interface 262, and a remote control interface 264. Although the plurality of tuners 254 are shown in FIG. 2, it is recognized that any number of tuners 254 may be used. For example, the content receiver 202 may have only one tuner 254.

Generally, the content receiver 202 can receive one or more television signals from a media provider such as a cable television distributor, a broadcast television distributor or a satellite television distributor. In the embodiment shown, the content receiver system 100 receives signals from a satellite television distributor via the satellite content receiver 202. One skilled in the art will recognize that the content receiver 202 can also receive video-digital subscriber line (VDSL), DSL, Internet 252, wireless and other signals from content or video distributors. The satellite content receiver 202 can process television signals and can send the processed signals to peripheral electronic devices, such as the display 204 and the remote control 226. The satellite content receiver 202 also can accept commands from the remote control 226 or other peripheral electronic devices. One skilled in the art will recognize that many embodiments of the content receiver system 100 are possible and within the scope of this disclosure. Other such embodiments can include, but are not limited to, various combinations or permutations of devices and connections for the delivery, storage, and display of communications, content and other data.

In one embodiment, the content receiver 202 receives media content from the satellite receiving antenna 206. A tuner of the one or more tuners 254 tunes into a selected media channel received by the satellite receiving antenna 206 to acquire a satellite signal. The tuner 254 can initially process the satellite signal. The tuner 254 can also receive subscriber commands in the form of signals from the control circuitry 266. Signals from the control circuitry 266 can include, but are not limited to, a signal to tune to a transponder as part of the process of selecting a certain media channel for viewing on a peripheral device. The tuner 254 transmits the acquired satellite signal to the control circuitry 266 where the signal can undergo extensive signal processing.

As described herein, the content receiver 202 can include multiple tuners 254. This allows the content receiver 202 to display or record multiple media programs that air simultaneously. Generally, a tuner 254 decodes a media signal 201 of one transponder (for example, of an Earth orbiting satellite). The media signal may carry a plurality of media channels, such as ten channels. The content receiver 202 can record media programs of one or more of the plurality of media channels carried on its corresponding transponder.

When the content receiver 202 includes two tuners 254, then the content receiver 202 can record or display any two media programs of interest to the user simultaneously. The two media programs may be on media channels that are broadcast on two different transponders. Further, the content receiver 202 can record or display can any other media program broadcast on other channels of the two transponders.

The DVR 256 can be used to record programs locally in the content receiver 202. For example, while viewing the programming guide the user may notice a TV show that is not broadcast at a convenient time. By using the remote control 226 the user can command the content receiver 202 to record the TV show to the DVR 256 so that the user may view the TV show at a later convenient time. When the user selects a program to be recorded to the DVR, the content receiver 202 sets a recording timer that causes the content receiver 202 to automatically record the selected program at the scheduled time. At a time convenient to the user, the user can operate the remote control 226 to cause the content receiver 202 to display a list of programs that have been recorded to the DVR. The user can select the desired program from the list of recorded programs and the content receiver 202 will play back the selected program.

The satellite content receiver 202 can be connected to the display 204 and the peripheral devices 220 through a peripheral interface 262. Such peripheral devices can send and receive signals to and from the satellite content receiver 202. For instance, a television can receive video and audio signals, whereas a stereo can receive only audio signals. One skilled in the art will recognize that the peripheral devices can include many types of commercially available electronic devices.

Another peripheral device and connection to the satellite content receiver 202 can include a phone line and modem. Content receiver 202 can use a modem and phone line to communicate with one or more outside entities or systems (e.g., satellite television distributor) using DSL or other protocol.

The remote control interface 264 includes instructions that allow a user to communicate with the satellite content receiver 202, and can be implemented using the peripheral interface 262 or by connecting a separate remote control interface device. The remote control interface 264 can translate an input from the user into a format understandable by the control circuitry 266. The remote control interface 264 can thus be considered a user interface (UI). The translation systems can include, but are not limited to, electronic receivers and electronic relays. The remote control interface 264 can receive commands from more than one remote control 226. The remote control 226 can use infrared, UHF, or other communications technology. One skilled in the art will recognize that other means to receive and translate user inputs are possible.

Figure 3:
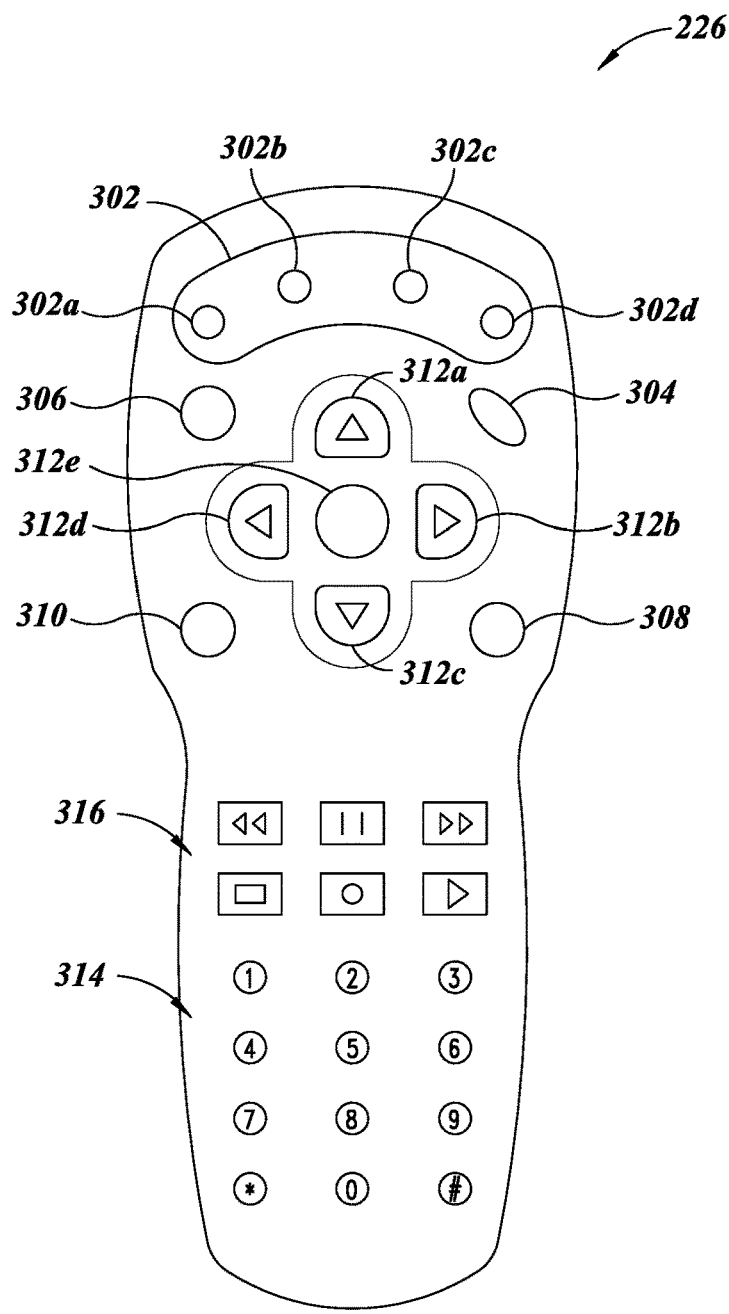
FIG. 3 illustrates some buttons on an exemplary remote control.

FIG. 3 illustrates some buttons on an exemplary remote control 226. The remote control 226 may have mode buttons 302a-d (collectively referred to herein as mode button 302) for placing the remote control 226 in an appropriate mode to communicate with a certain device. To communicate with the content receiver 202, the remote control 226 may be placed in a SAT mode, short for satellite, by selecting a SAT mode 302a. Pressing a TV mode button 302b places the remote control 226 in a TV mode and subsequent button presses control the TV. Similarly, pressing a DVR mode button 302c puts the remote control 226 in a DVR mode. Pressing an AUX mode button 302d puts the remote control 226 in an auxiliary mode and allows the user to control a configured audio system using the remote control 226.

The remote control 226 has a guide button 304. Actuating the guide button 304 invokes the display of an electronic programming guide on the display 204 as a graphical user interface (GUI), for example. The remote control 226 has a menu button 306 that, when actuated, by pressing for example, invokes display of a menu for controlling a selected device, such as the content receiver 202. The remote control 226 also has an exit button 308 that when actuated exits the electronic programming guide, the menu for controlling a selected device or any other menu.

The remote control 226 includes a recall button 310 (labelled as "LAST" in FIG. 3). Actuating the recall button 310 invokes presenting a recall list (also referred to herein as a recall menu). The recall menu may show a list of media channels previously accessed. The number of media channels that are part of the recall list may vary. For example, there may be five or ten previously viewed channels as part of the recall list. The user may navigate to a channel in the recall list and select the media channel for viewing. As described herein, the recall list may identify the media channels by a channel number. Furthermore, the recall list may show in a various regions of the display 204 the live programming of the channels in the recall list.

The remote control 226 may also have arrow and selection buttons 312. These buttons are used to navigate through menus and graphical user interfaces and to select a desired option. The arrow and selection buttons 312 preferably include an up arrow button 312a, a right arrow button 312b, a down arrow button 312c, a left arrow button 312d and a selection button 312e. The remote control 226 may also have a plurality of numbers buttons 314 for entering channel numbers or navigating through menus or program guides. In addition, the remote control 226 may have a plurality of DVR buttons 316 for fast forwarding, pausing, rewinding, playing, recording or stopping programming.

Figure 4:
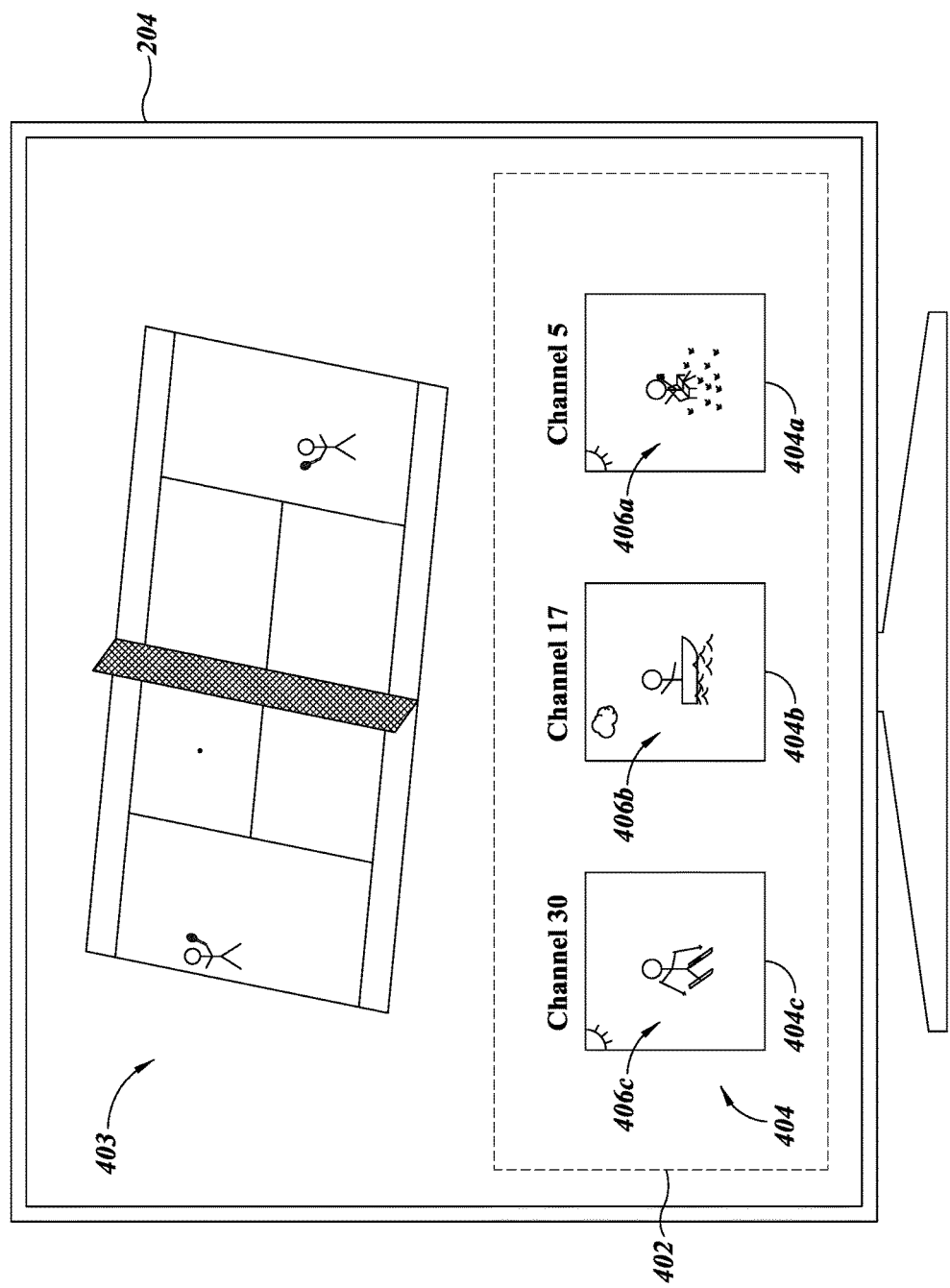
FIG. 4 depicts presenting a recall list on the display.

FIG. 4 depicts presenting a recall list on the display 204. The recall list 402 may be presented in response to a user actuating the recall button 310 on the remote control 226 as described herein. Pressing the recall button 310 triggers the remote control 226 to send a recall command to the content receiver 202 indicating that the recall list 402 should be displayed. As a result, the content receiver 202 outputs the recall list 402 to the display 204.

Prior to actuating the recall button 310 the display 204 shows a first video stream 403. The first video stream 403 may be shown in full screen mode. In the full screen mode, the first video stream 403 may be shown in an entire region on the display 204. The first video stream 403 may be a live broadcast of a media channel. Further, the first video stream 403 may be playback of a recoded program.

The recall list 402 identifies a plurality of media channels previously viewed by a user and provides the user with the option of selecting a media channel of the plurality of media channels for viewing in full screen mode. Instead of merely identifying the media channels by channel number or other identifier, such as a channel name, the recall list 402 displays a video stream for each media channel of the plurality of media channels. The video stream may be the present live programming broadcast on a media channel. Further, the video stream may be a preview, trailer or snippet of a recoded program.

As shown in FIG. 4, a plurality of video streams 406a-c are displayed as part of the recall list 402. The plurality of video streams 406a-c are shown in a corresponding plurality of regions 404a-c of the display 204. Each region of the plurality of regions 404a-c is separate and distinct from another region of the plurality of regions 404a-c. Each region may occupy an area of the display that does not overlap with an area occupied by another region. Each region may be a rectangle sized and dimensioned in accordance with a standard aspect ratio of video streams. For example, the plurality of regions 404a-c may each have an aspect ratio of 16:9. The plurality of regions 404a-c may be contiguous or separated from each other by an intervening region. Further, the plurality of regions 404a-c may be arranged in a row (as shown in FIG. 4) or in a column. Further, the plurality of regions 404a-c may be arranged in a matrix. For example, a 3×3 matrix may be used to show nine video streams of nine media channels that are part of the recall list 402.

The plurality of regions 404a-c may be positioned in the display 204 to reflect a chronological order of access to the media channels that are part of the recall list. For example, the first region 404a (positioned rightmost among the plurality of regions 404a-c) displays the video stream 406a of the most recently viewed media channel. The third region 404c (positioned leftmost among the plurality of regions 404a-c) displays the video stream 406a of the oldest viewed media channel.

The plurality of video streams 406a-c may be associated with a respective plurality of audio streams. For example, the video stream may be a video component of audiovisual content, whereas the audio stream may be an audio component of the audiovisual content. While the plurality of video streams are displayed, their associated plurality of audio streams may be muted and may not be output to speakers. Instead the audio stream of (or audio portion associated with) the first video stream 403 may be output to speakers while the recall list 402 is shown. That is, the user may view the recall list 402 while listening to the audio of the first video stream 403 rather than the audio streams of the plurality of video streams 406a-c of the recall list 402.

A user may navigate using the remote control 226 or arrow and selection buttons 312 thereof to a region 406 displaying a channel or a video stream of interest. The user may select the region 406 using the selection button 312e. Upon selection of the region 406, the video stream displayed in the region is displayed in full screen mode on the display 204. The first video stream 403 may no longer be displayed. Furthermore, the remaining video streams of the plurality of video streams 406a-c other than the selected video stream may no longer be displayed.

Alternatively, the user may abandon the recall list 402 (for example, by pressing the exit button 308) and return to viewing the first video stream 403. Afterwards, the user may again actuate the recall button 310 and a subsequent recall list (now shown in FIG. 4) may be displayed. The subsequent recall list may as described herein show a number of video streams of a corresponding number media channels previously viewed. As may be recognized the recall list excludes the media channel being viewed at the time of the user's actuation of the recall button 310.

It is recognized that display of a recall list comprising a plurality of video streams enhances the user's experience in interacting with the content receiver 202. Display of a video stream of a media channel in the display region as opposed to only a channel number or other channel identifier may permit the user to identify the content being broadcast on the media channel. The user may determine whether he/she wants to view the channel based on the recall list. That saves the user time and effort. For example, the user does not need to navigate to the media channel to determine if he/she wants to view a media program presently broadcast. Instead the user may judge based on the displayed video stream of the recall list whether he/she wants to view the media program presently broadcast.

It is noted that the recall list 402 may be superimposed on the first video stream 403 and may block or render not viewable a portion of the first video stream 403. Further, the first video stream 403 may be resized such that the first video stream 403 is displayed in a first region of the display 204 (with its aspect ratio maintained without change). Meanwhile the recall list 402 is displayed in a second region of the display 204 that is overlapping or non-overlapping with the first region.

Figure 5:
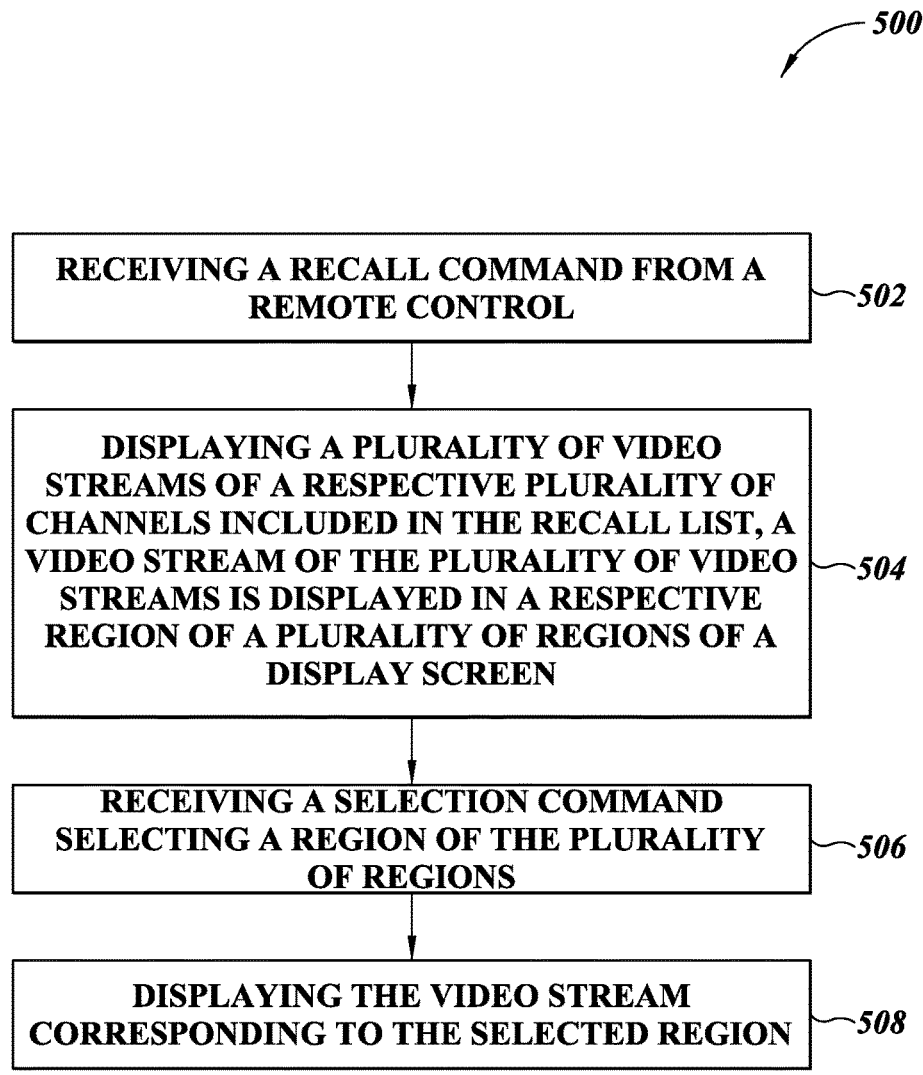
FIG. 5 shows a flow diagram of a method for displaying a recall list comprising a plurality of video streams.

FIG. 5 shows a flow diagram of a method 500 for displaying a recall list comprising a plurality of video streams. In the method 500, the content receiver receives, at 502, a recall command from the remote control 226. The content receiver 202 then outputs, at 504, a plurality of video streams of a respective plurality of channels included in the recall list. The plurality of video streams are output to the display 204. A video stream of the plurality of video streams is displayed in a respective region of a plurality of regions of the display 204. To enable display of the plurality of video streams, the plurality of tuners 254 decode media channels received over a communication link, such as the communication link 208 described with reference to FIG. 2 herein. The video streams of the media channels are output to the display 204 in order to be displayed as part of the recall list.

At 506, the content receiver 202 receives a selection command selecting a region of the plurality of regions. The content receiver at 508 outputs the video stream corresponding to the selected region to the display 204. The video stream may be displayed in full screen mode as described herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
decoding, by a plurality of tuners of a content receiver, a respective plurality of satellite signals to obtain a plurality of video streams, respectively, that are each a live broadcast of a respective channel showing an active live program, the plurality of video streams including a first video stream and a plurality of second video streams;
displaying the first video stream in a full screen mode in an entire region of a display screen without simultaneous displaying another video stream;
receiving a first recall view command from a remote control;
presenting a recall list in response to receiving the first recall view command, presenting the recall list including:
displaying the first video stream in an upper region of the display screen occupying at least an upper half of the display screen; and
displaying the plurality of second video streams in a lower region of the display screen, below the upper region, occupying less than a lower half of the display screen, a video stream of the plurality of second video streams being displayed in a respective region of a plurality of regions of the lower region of the display screen and the video stream having an aspect ratio that represents width and length dimensions of the video stream, displaying the plurality of second video streams including:
chronologically displaying the plurality of second video streams rightmost to leftmost corresponding to an order of access with a most recently viewed video stream of the plurality of second video streams being displaying in a rightmost region of the plurality of regions and a least recently viewed video stream of the plurality of second video streams being displaying in a leftmost region of the plurality of regions;
sizing and dimensioning the respective region in accordance with the aspect ratio of the video stream; and
resizing the video stream of the plurality of second video streams and displaying the video stream in the respective region with its aspect ratio maintained without change; and
outputting one first audio stream associated with the first video stream while the plurality of second video streams are being displayed and muting all remaining second audio streams associated with the plurality of second video streams while the plurality of second video streams are being displayed;
after displaying the recall list, receiving a stream selection from the remote control indicating selection of the video stream of the plurality of second video streams being displayed; and
displaying the video stream of the plurality of second video streams but not the first video stream or other video stream of the plurality of second video streams.

2. The method of claim 1, wherein the recall list is a chronologically ordered list including a first number of video streams having been previously displayed prior to display of the first video stream.

3. The method of claim 2, wherein an order of the recall list is from most recent to oldest.

4. The method of claim 2, further comprising: receiving a second recall view command; and displaying a plurality of third live video streams corresponding to a respective plurality of third channels, a third live video stream of the plurality of third live video streams is displayed in a respective region of the plurality of regions of the display screen.

5. The method of claim 1, wherein displaying the plurality of second video streams further includes superimposing at least one video stream of the plurality of second video streams on at least a portion the first video stream.

6. The method of claim 1, wherein presenting the recall list includes: displaying the plurality of second video streams as arranged in a matrix.

7. A system comprising:
a display screen; and
a content receiver including a plurality of tuners configured to receive a plurality of satellite signals, respectively, and decode the plurality of satellite signals to obtain a plurality of video streams, respectively, that are each a live broadcast of a respective channel showing an active live program, the plurality of video streams including a first video stream and a plurality of second video streams, the content receiver being configured to:
output the first video stream to the display screen for display in a full screen mode in an entire region of the display screen without simultaneous displaying another video stream;
receive a first recall view command from a remote control;
output, to the display screen, a recall list in response to receiving the first recall view command, outputting the recall list including:
outputting the first video stream for display in an upper region of the display screen occupying at least an upper half of the display screen;
outputting the plurality of second video streams for display in a lower region of the display screen, below the upper region, occupying less than a lower half of the display screen, a video stream of the plurality of second video streams being displayed in a respective region of a plurality of regions of the lower region of the display screen and the video stream having an aspect ratio that represents width and length dimensions of the video stream, the respective region is sized and dimensioned in accordance with the aspect ratio of the video stream displayed in the respective region, and the video stream of the plurality of second video streams is resized and displayed in the respective region with its aspect ratio maintained without change; and causing the plurality of second video streams to be chronologically ordered rightmost to leftmost corresponding to an order of access with a most recently viewed video stream of the plurality of second video streams displayed in a rightmost region of the plurality of regions of the lower region of the display screen and a least recently viewed video stream of the plurality of second video streams displayed in a leftmost region of the plurality of regions of the lower region of the display screen;

output one first audio stream associated with the first video stream while the plurality of second video streams are being displayed and mute all remaining second audio streams associated with the plurality of second video streams while the plurality of second video streams are being displayed;

after outputting the recall list, receive a stream selection from the remote control indicating selection of the video stream of the plurality of second video streams; and output the video stream of the plurality of second video streams for display on the display screen but not the first video stream or other video stream of the plurality of second video streams.

8. The system of claim 7, wherein the recall list is an ordered list including a first number of video streams having been previously displayed prior to display of the first video stream.

9. The system of claim 8, wherein an order of the recall list is from most recent to oldest.

10. The system of claim 8, wherein the content receiver is further configured to: receive a second recall view command; and output, to the display screen, a plurality of third live video streams corresponding to a respective plurality of third channels.

11. The system of claim 10, wherein the display screen is configured to display the plurality of third live video streams in the respective plurality of regions of the display screen.

12. The system of claim 7, further comprising: a satellite receiving antenna, configured to receive a first satellite signal and a second satellite signal.

13. The system of claim 12, wherein a first tuner of the plurality of tuners of the content receiver decodes a first channel of a plurality of channels based on the first satellite signal and a second tuner of the plurality of tuners of the content receiver decodes a second channel of the plurality of channels based on the second satellite signal.

14. The system of claim 7, wherein the display screen is further configured to superimpose the plurality of second video streams on the first video stream.

15. A content receiver comprising:

a plurality of tuners configured to receive a plurality of satellite signals, respectively, and decode the plurality of satellite signals to obtain a plurality of video streams, respectively, that are each a live broadcast of a respective channel showing an active live program, the plurality of video streams including a first video stream and a plurality of second video streams; and control circuitry configured to:

output, to a display screen, the first video stream for display in a full screen mode in an entire region of the display screen without simultaneous displaying another video stream;

receive a first recall view command from a remote control;

output, to the display screen, a recall list in response to receiving the first recall view command, outputting the recall list including:

outputting the first video stream for display in an upper region of the display screen occupying at least an upper half of the display screen;

outputting the plurality of second video streams for display in a lower region of the display screen, below the upper region, occupying less than a lower half of the display screen, each video stream of the plurality of second video streams being displayed in a respective region of a plurality of regions of the lower region of the display screen and having an aspect ratio that represents width and length dimensions of the video stream, the respective region is sized and dimensioned in accordance with the aspect ratio of the video stream displayed in the respective region, and the video stream of the plurality of second video streams is resized and displayed in the respective region with its aspect ratio maintained without change; and causing the plurality of second video streams to be chronologically ordered rightmost to leftmost corresponding to an order of access with a most recently viewed video stream of the plurality of second video streams displayed in a rightmost region of the plurality of regions of the lower region of the display screen and a least recently viewed video stream of the plurality of second video streams displayed in a leftmost region of the plurality of regions of the lower region of the display screen;

output one first audio stream associated with the first video stream while the plurality of second video streams are being displayed and mute all remaining audio streams associated with the plurality of second video streams while the plurality of second video streams are being displayed;

receive a stream selection from the remote control indicating selection of a second video stream of the plurality of second video streams; and output the second video stream of the plurality of second video streams for display on the display screen but not the first video stream or other video stream of the plurality of second video streams.

16. The content receiver of claim 15, wherein the recall list is an ordered list including a first number of video streams having been previously displayed.

17. The content receiver of claim 15, wherein the control circuitry is further configured to: receive a second recall view command; and output, to the display screen, a plurality of third video streams corresponding to a respective plurality of third channels.

18. The content receiver of claim 15, wherein the display screen is further configured to superimpose at least one video stream of the plurality of second video streams on the first video stream displayed in the full screen mode prior to receiving the stream selection.

* * * * *